(12) United States Patent
Deanesi

(10) Patent No.: US 9,539,870 B2
(45) Date of Patent: Jan. 10, 2017

(54) VALVE UNIT FOR INFLATING WHEELS

(71) Applicants: Alberto Deanesi, Verona (IT); Gabriele Tezza, Oppeano (VR) (IT)

(72) Inventor: Alberto Deanesi, Verona (IT)

(73) Assignees: Alberto Deanesi, Verona (IT); Gabriele Tezza, Oppeano (IT)

( * ) Notice: Subject to any disclaimer, the term of this patent is extended or adjusted under 35 U.S.C. 154(b) by 125 days.

(21) Appl. No.: 14/394,717

(22) PCT Filed: Apr. 17, 2013

(86) PCT No.: PCT/IB2013/000719
§ 371 (c)(1),
(2) Date: Oct. 15, 2014

(87) PCT Pub. No.: WO2013/156845
PCT Pub. Date: Oct. 24, 2013

(65) Prior Publication Data
US 2015/0091273 A1    Apr. 2, 2015

(30) Foreign Application Priority Data

Apr. 20, 2012 (IT) .............................. VI2012A0092

(51) Int. Cl.
*B60C 29/02* (2006.01)
*B60C 29/00* (2006.01)
(Continued)

(52) U.S. Cl.
CPC .............. *B60C 29/02* (2013.01); *B60B 21/12* (2013.01); *B60C 29/005* (2013.01); *B60C 29/007* (2013.04); *B60B 21/025* (2013.01); *B60B 2310/314* (2013.01); *B60C 2200/12* (2013.04); *Y10T 137/0491* (2015.04); *Y10T 137/3584* (2015.04)

(58) Field of Classification Search
CPC ...... B60C 29/00; B60C 29/002; B60C 29/005; B60C 29/02
USPC .................................................. 152/427–429
See application file for complete search history.

(56) References Cited

U.S. PATENT DOCUMENTS 1,650,502 A   11/1927  Ehrler
2,608,235 A    8/1952  Wyman
(Continued)

FOREIGN PATENT DOCUMENTS

EP    1 635 095 A1    3/2006

OTHER PUBLICATIONS

International Search Report and Written Opinion dated Aug. 30, 2013, issued in PCT Application No. PCT/IB2013/000719, filed Apr. 17, 2013.

*Primary Examiner* — Jason Bellinger
(74) *Attorney, Agent, or Firm* — Workman Nydegger

(57) ABSTRACT

A valve unit (1) with a single-piece valve body (4) includes a cylindrical collar (5), a valve seat (7), a main duct (9) and an auxiliary duct (10). The cylindrical collar (5) projects from a reference plane (12) obtained in the valve body (4) and is configured so that it can be arranged against a rim (2) when the cylindrical collar (5) is inserted in a hole (6). The cylindrical collar (5) has an end (5*a*) configured so that it can be deformed and can define a flared portion (13) of the main duct (9) which interferes with the rim (2) at the level of the hole (6) thus providing a mechanism (11) for fixing the valve unit (1) to the rim (2).

12 Claims, 5 Drawing Sheets

(51) Int. Cl.
*B60B 21/12* (2006.01)
*B60B 21/02* (2006.01)

(56) References Cited

U.S. PATENT DOCUMENTS

| | | | | |
|---|---|---|---|---|
| 2,855,015 A | * | 10/1958 | Atkin | B60C 29/02 152/427 |
| 2,864,426 A | * | 12/1958 | Williams | B60C 29/02 152/427 |
| 2,917,098 A | * | 12/1959 | Hilton | B60C 29/02 152/427 |
| 4,171,119 A | | 10/1979 | Lamson | |
| 6,354,348 B1 | | 3/2002 | Taillandier | |
| 6,820,668 B2 | * | 11/2004 | Passarotto | B60B 21/025 152/427 |
| 2011/0056602 A1 | * | 3/2011 | Thomas | B60C 29/02 152/427 |

* cited by examiner

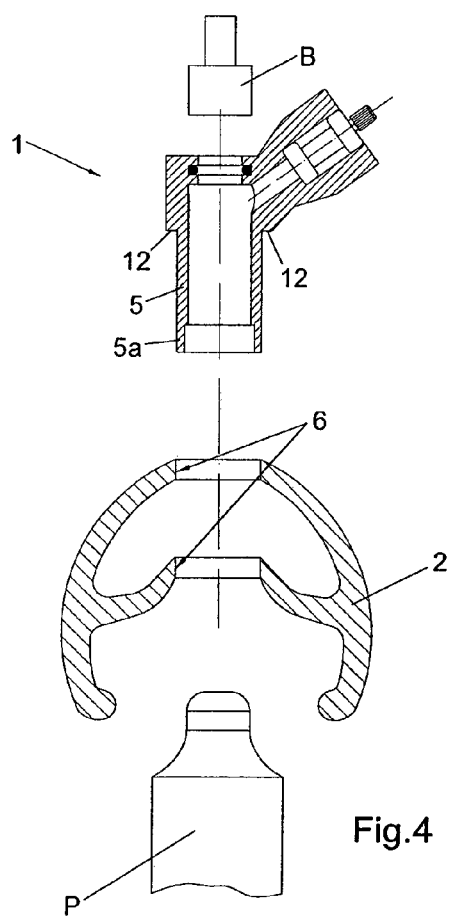
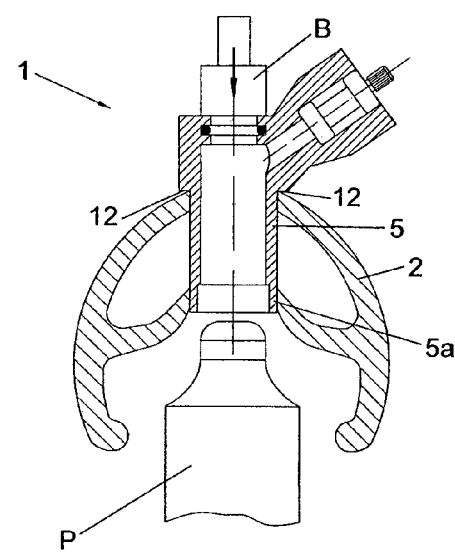
Fig.4
Fig.5
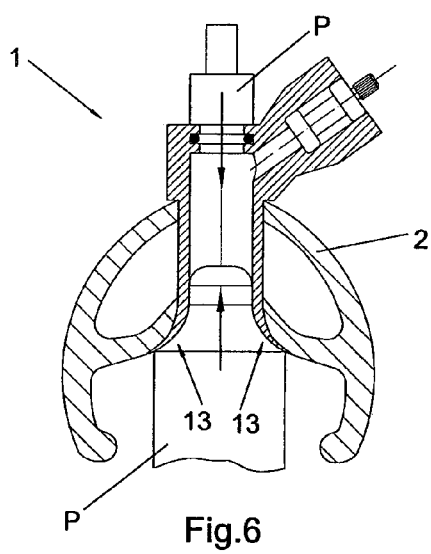
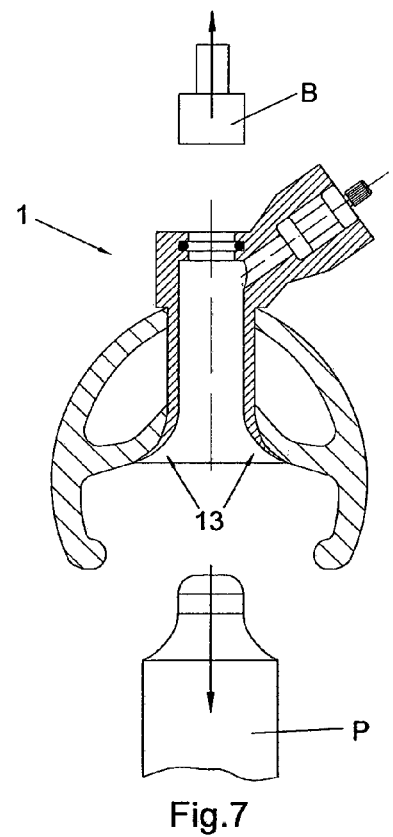
Fig.6
Fig.7

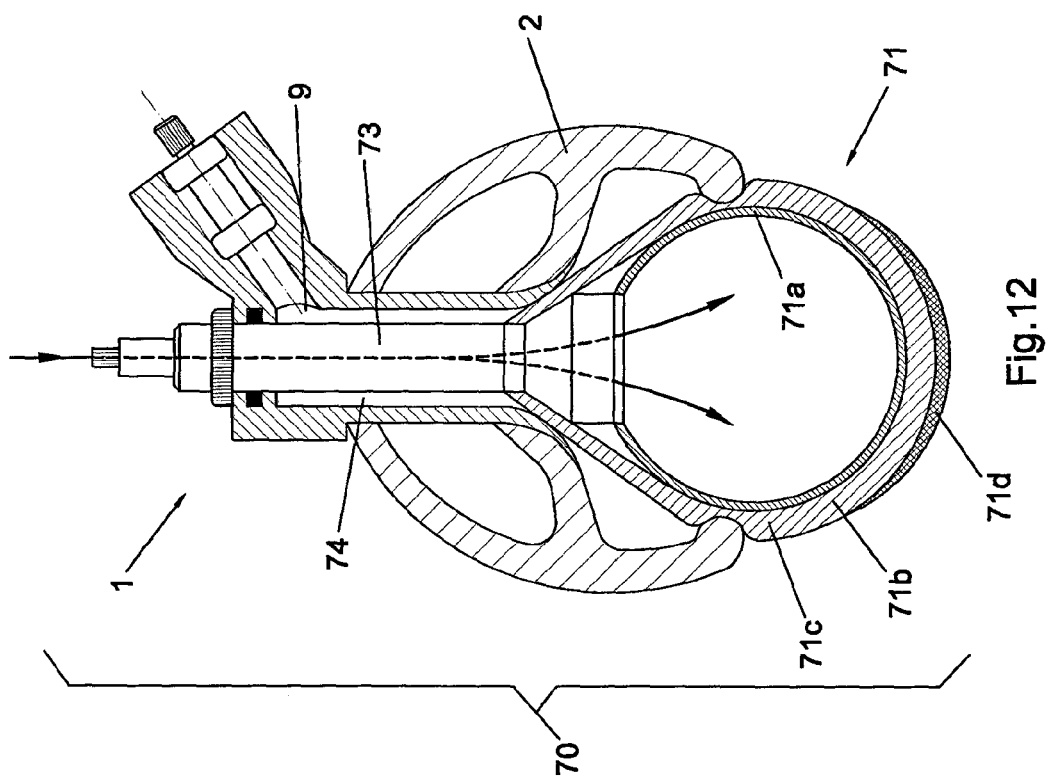

VALVE UNIT FOR INFLATING WHEELS

BACKGROUND OF THE INVENTION

1. Field of the Invention

The invention concerns an improved valve unit for inflating wheels.

2. Present State of the Art

The valve unit that is the subject of the invention is particularly useful for bicycle wheels comprising an inflatable tyre provided with an inflatable inner tube or tubular tyre, wherein the tyre and the internal element are inflated selectively so as to make the tyre shoulders adhere to the rim and thus prevent the tyre from coming off the rim and skidding while the bicycle is running.

The valve unit that is the subject of the invention can be conveniently used also for inflating tubeless tyres or tyres with inner tube or even tubular tyres of the known type comprising an inner tube outside which the casing of a covering element is sewn.

The valve unit of the invention is thus conveniently and advantageously used on touring bikes or racing bikes, on cyclocross bikes or bikes for other types of applications like freeride, cross country, downhill and the like.

Furthermore, the valve unit of the invention can also be used on the wheels of electric bicycles or the wheels of motor cycles of various types.

It is known that in order to inflate tyres of the mentioned types valves are presently used that project from the rim and are connected to a pipe that conveys a pressurized fluid.

If the wheels are provided with tubular tyre or with standard tyre with inner tube or with inflatable tubeless tyre, inflation is obtained using the valve with which tubular tyres, inner tubes or tubeless tyres are provided and which projects from the rim.

If, on the other hand, the wheels require inflation of both the tyre and the inflatable inner chamber, which can be a traditional inner tube or a tubular tyre, two distinct valves projecting from the rim are used, each one of which is in communication with the chamber to be inflated.

Multiple embodiments of wheels of this type are known, all posing the drawback that they need two holes in the rim.

In order to avoid making two holes and thus in order to be able to use standard rims with one hole only, valve units are employed that use the only through hole present in the rim and allow both the tyre and the inflatable chamber present inside it to be inflated.

In particular, patent document U.S. Pat. No. 2,608,235 is known, which describes a valve unit comprising a main tubular body that is arranged so that it passes through the hole in the rim and is provided with a lateral hole in which, using screw means, a secondary tubular body provided with an inflation valve is connected.

In this way, a main through duct is defined in the main tubular body and a secondary duct that communicates with the main duct is defined in the secondary tubular body.

When the valve unit is installed on the wheel, the main duct accommodates the valve of the inflatable inner chamber that passes through it and the secondary duct of the secondary tubular body communicates with the tyre through a tubular chamber that is defined between the main duct and the valve of the inflatable chamber.

The valve body described above offers the advantage that it allows the use of a single hole present in the rim to inflate both the tyre and the inflatable chamber provided inside it but on the other hand it poses some recognised drawbacks.

A first drawback is represented by the fact that the end of the tubular body—at the level of the hole in the rim—features an area with larger diameter that is placed in contact with the inner surface of the rim and projects towards the inside of the tyre.

The presence of said area with larger diameter is indispensable in order to allow the valve body to be fastened to the rim by tightening a threaded nut that is screwed on the outside of the tubular body but constitutes a hindrance and an impediment for the tyre's inner chamber that when inflated cannot adhere well and completely to the inner surface of the rim.

Another drawback lies in that making the valve body in various pieces means increasing production costs, especially due to the need to machine the parts that must be coupled together.

Furthermore, making the valve body in various pieces makes the operations required for assembling the valve body onto the rim longer, more difficult and thus also more expensive.

Finally, the presence of the parts coupled together and of the threaded nuts for fixing to the rim makes the valve body heavier.

The US patent document U.S. Pat. No. 6,354,348 is also known, which describes an inflation valve for tyres that is applied to the valve belonging to the tyre and is arranged so that it passes through the hole present in the rim.

A drawback posed by the valve lies in that it is made up of two parts connected together and to fix it to the tyre's valve it is necessary to use removable mechanical means.

Furthermore, another drawback is represented by the fact that the valve of the invention allows the tyre to be inflated only if said valve is applied to a valve belonging to the tyre.

The US patent document U.S. Pat. No. 1,650,502 is also known, which described an inflation valve that projects from a through hole made in the rim and belongs to two inner tubes provided inside the tyre.

Two inflation ducts are created along the valve body, each one of which communicates with one of said inner tubes, and to fix the valve to the rim it is necessary to use removable mechanical connection means, in the specific case a nut with the relative washer.

Furthermore the valve, in order to allow the inflation of the tyre, must be connected—using further mechanical connection means—to a shaped fitting that houses the unidirectional valves that communicate with the inflation ducts that are present in the valve body and are independent of each other.

Said valve also has the limitation of being fixed to the tyre's inner tube and thus of being suited to allow only the inner tube to which it belongs to be inflated.

Furthermore, the valve described in the above mentioned patent document poses the dual drawback of being made up of two parts that must be connected to each other and of requiring the use of removable fixing means in order to be connected to the rim.

The patent document EP 1 635 095 is also known, which describes an inflation valve that projects from a through hole made in the rim housing the tyre and belongs to an inner tube arranged inside the tyre.

Also this valve has the limitation of allowing only the inner tube to which it is applied to be inflated and thus only a tyre using said inner tube.

Furthermore, it also poses the drawback of requiring the use of removable mechanical means when it has to be connected to the rim.

Finally, it is provided with two ducts for the passage of the inflation gas, wherein said ducts are made in the valve body, are independent of each other and must be connected to a special inflation fitting when it is necessary to inflate the tyre.

The US patent document U.S. Pat. No. 4,171,119 is also known, which describes a valve for tire having a main duct provided at one and of a flared portion. This flared portion is for bonding the valve directly to the tube and is secured to the tube by molding operation and not to the rim. Furthermore, the valve is not in a single body but it is composed with more elements assembled together.

SUMMARY OF THE INVENTION

The present invention intends to overcome all the drawbacks and the limitations described above.

In particular, it is a first object of the invention to provide a valve body that can be applied to a single hole present in the rim and that does not occupy space inside the rim in the area corresponding to the hole in which it is inserted.

It is another object of the invention to provide a valve unit made in a single piece.

It is a further object of the invention to provide a valve unit that is easier to assemble compared to equivalent valve units of the known type and in particular compared to the valve units described in the patents mentioned above.

It is another object of the invention to provide a valve unit that does not require the use of removable fixing means for application to the rim.

It is another yet not the least object of the invention to provide a valve unit with reduced size and weight compared to the valve units described in the patents mentioned above.

The objects listed above are achieved by the valve unit according to the main claim.

Other characteristics of the invention are illustrated in the dependent claims.

To advantage, the valve unit of the invention is conveniently used to selectively inflate wheels comprising an inflatable tyre with an inflatable inner chamber.

The latter can be an inner tube of the known type or a tubular tyre that is also of the known type and comprises an inner tube on the outside of which the casing of a covering element provided with shoulders and tread is sewn.

The inflatable chamber may indifferently be provided with its own inflation valve or not.

Advantageously, it is possible to employ used tubular tyres of the known type, no more suitable for use in standard operating conditions, which instead of being definitively rejected can be recycled for this type of application.

Still to advantage, the valve unit of the invention may also allow the inflation of traditional wheels provided with inner tube tyres or tubeless tyres or again with inner tube tyres or tubular tyres of the type previously described.

Therefore, the application of the valve body of the invention to a rim makes it possible to obtain a wheel that can be indifferently provided with a tubeless tyre, or an inner tube tyre or a tubular tyre, at the user's discretion.

BRIEF DESCRIPTION OF THE DRAWINGS

The objects and advantages described above will be highlighted in greater detail in the description of the embodiment of the invention that is provided here below by way of non-limiting example, with reference to the attached drawings, wherein:

FIGS. 4 to 7 show the stages of assembly of the valve unit of the invention on the rim;

FIGS. 8 to 12 show different application variants of the valve unit of the invention intended to obtain different embodiments of wheels.

DETAILED DESCRIPTION OF THE PREFERRED EMBODIMENTS

Figures 1, 2:
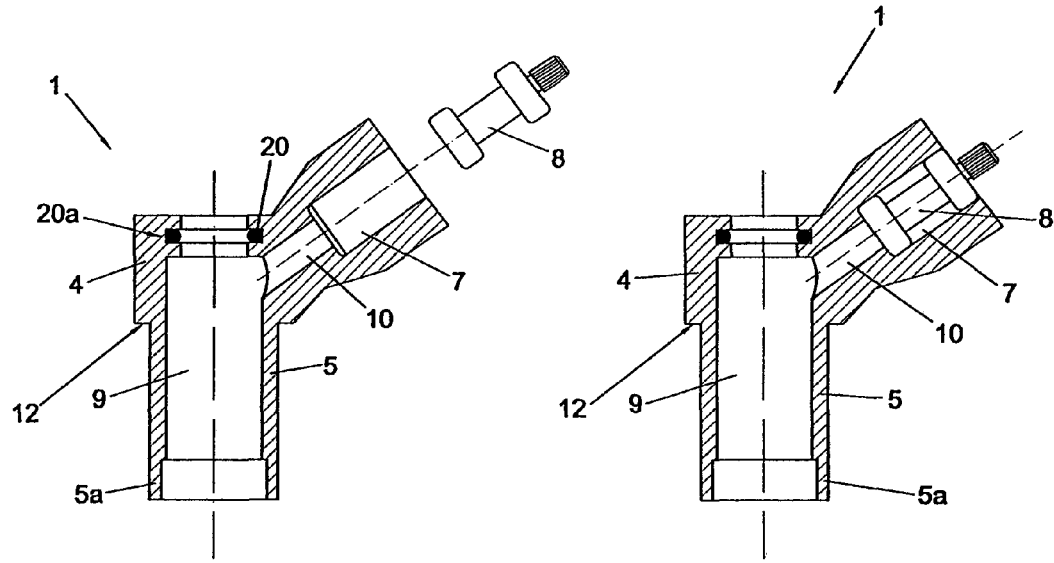
FIG. 1 shows the exploded longitudinal cross section of the valve unit that is the subject of the invention.
FIG. 2 shows the valve unit of FIG. 1 when assembled.
Figure 3:
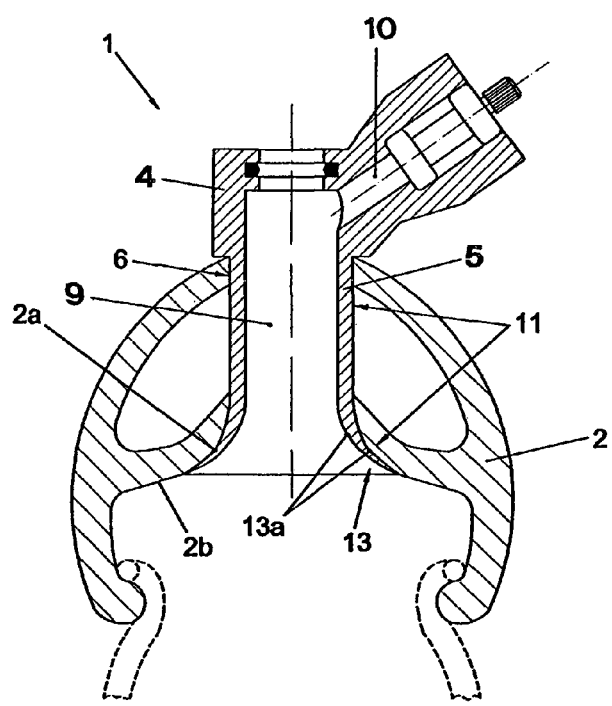
FIG. 3 shows the valve of FIG. 2 applied to a rim.

The valve unit that is the subject of the invention is shown in FIGS. 1 and 2, where it is indicated as a whole by 1, and in FIG. 3, where it is applied to the rim 2 of a wheel.

It can be observed that it comprises a valve body 4 in which it is possible to identify a cylindrical collar 5 suited to be inserted in a hole 6 made in the rim 2 and a valve seat 7 accommodating an auxiliary valve 8 for inflating the tyre or the inflatable chamber that will be applied to the rim 2.

The valve body 4 is provided with a main through duct 9 that develops along the entire length of the cylindrical collar 5 and an auxiliary through duct 10 that develops along the entire length of the valve seat 7 and intersects the main through duct 9 placing it in communication with the valve seat 7.

Fixing means indicated as a whole by 11 make it possible to fix the valve body 4 to the rim 2.

According to the invention, the valve body 4 is a single-piece body in which the cylindrical collar 5, the valve seat 7 and the main duct 9 and auxiliary duct 10 are obtained and in which the cylindrical collar 5 projects from a reference plane 12 obtained in the valve body 4 and is arranged against the rim 2 when the cylindrical collar 5 is inserted in the hole 6 present in the rim 2.

The valve seat 7 is shaped in such a way as to allow the insertion of an inflation valve 8 of the type known per se and available on the market.

The outer diameter of the cylindrical collar 5 is larger smaller than the diameter of the hole 6 in the rim 2 that houses it.

The fixing means 11 that constrain the valve body 4 into the hole 6 provided in the rim 2 are defined by the interference between the outer diameter of the cylindrical collar 5 and the inner diameter of the hole 6 present in the rim and by a flared portion 13 of the main duct 9 created through the deformation of the end 5a of the cylindrical collar 5 and interfering with the rim 2 at the level of the hole 6.

The flared portion 13 has its convex surface 13a facing towards the tyre applied to the rim 2 and the length of the cylindrical collar 5 must be such that, when the latter is inserted in the hole 6 provided in the rim 2, the flared portion 13 can be made so that its convex surface 13a is connected with the profile 2a of the inner surface 2b of the rim 2, as shown in FIG. 3.

Therefore, at the level of the hole 6 in the rim no thickened portion projecting towards the inside of the tyre and of the rim 2 is created, as on the other hand occurs in the known embodiment described in the above mentioned patent document U.S. Pat. No. 2,608,235.

Furthermore, the convex surface 13a of the flared portion 13 facing towards the tyre makes it easier to rest any inner tube or tubular tyre present inside the tyre onto the inner surface of the rim 2.

It can thus be understood that the valve unit 1 that is the subject of the invention achieves one of the set objects, that is, it does not create any obstacle inside the tyre at the level of the hole 6 through which the valve unit 1 is connected to the rim 2.

Furthermore, as the valve body 4 is made in a single piece, the time necessary for assembly on the rim 2 as well as production costs are reduced compared to the embodiment described in patent document U.S. Pat. No. 2,608,235 or to other embodiments in which the valve unit comprises several pieces assembled together and on the rim through removable fixing means.

In particular, the valve body 4 can be stamped or produced by casting and successive machining of its parts, or can be made directly by machining a rolled or drawn semi-finished product with a machine tool.

In practice, the assembly of the valve unit 1 of the invention on the rim 2 can be obtained according to a preferred but not unique operating sequence illustrated in FIGS. 4 to 7.

The assembly sequence starts as shown in FIG. 4, in which the valve body 4 is arranged so that it is coaxial with the hole 6 provided in the rim 2, included between the ram B of a press and a shaping punch P.

The thrusting force exerted by the ram B forces the cylindrical collar 5 of the valve body 4 into the hole 6 until the reference plane 12 comes in contact with the rim 2 as shown in FIG. 5, while the shaping punch P approaches the end 5a of the cylindrical collar 5.

The pressure that keeps to be exerted with the ram B forces the shaping punch P inside the main duct 9 in such a way as to deform the end 5a of the cylindrical collar 5 and obtain the flared portion 13.

As shown in the figures, and in particular in FIGS. 1 and 2, since the collar 5 is cylindrical and the inner diameter of the end 5a is larger than the inner to diameter of the main duct 9, the thickness of the wall of the end 5a is inferior to the thickness of the collar 5 over the entire length of the main duct 9.

The end 5a can thus be easily deformed in order to obtain the flared portion 13 that permanently constrains the valve body 4 to the rim 2.

To ensure tightness against any possible air leak from the inside of the tyre towards the outside, before making the flared portion a layer of sealing material is placed between the end 5a of the cylindrical collar 5 and the rim 2.

At this point the valve body 4 is securely fixed to the rim thanks to the interference between the diameters of the cylindrical collar 5 and the hole 6 and the locking action due to the presence of the flared portion 13 as shown in FIG. 7.

The valve unit 1 of the invention is applied to a rim 2 to obtain wheels in different construction forms shown in the figures from 8 to 12.

Figure 8:
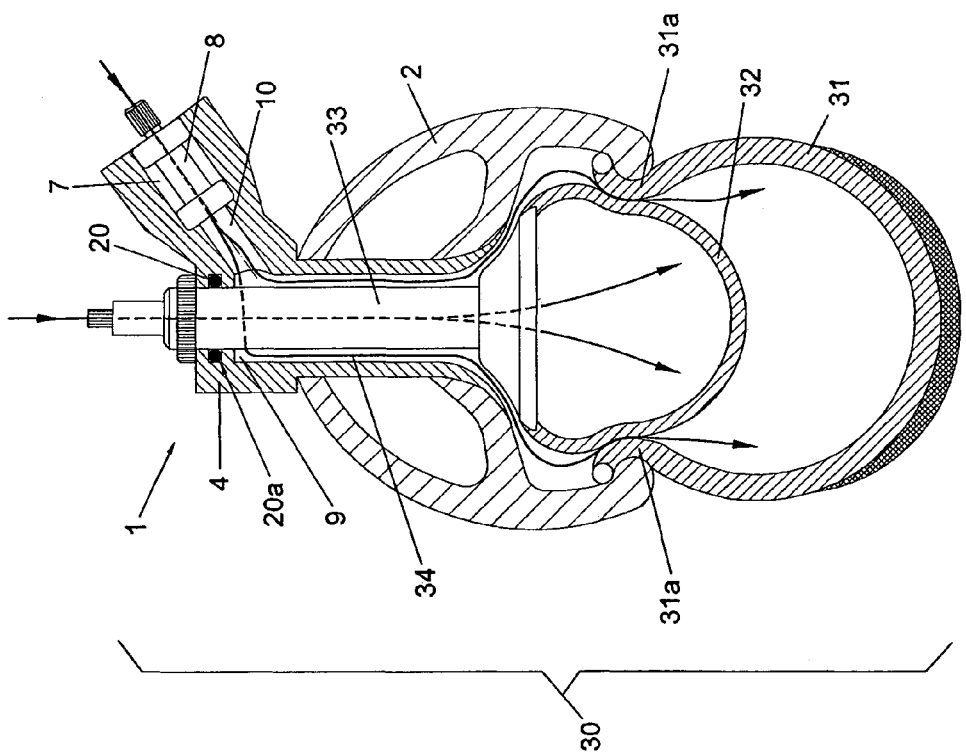

An embodiment of the valve unit 1 of the invention can be used to obtain the wheel shown in FIG. 8 and indicated as a whole by 30 which, as can be observed, comprises the rim 2 that is associated with an inflatable tyre 31 inside which there is an inner tube 32.

The inner tube 32 is provided with the standard inflation valve 33 that is inserted in the main duct 9 of the valve body 4 with the projecting end of the valve unit 1, as shown in FIG. 8.

A sealing ring 20 housed in a seat 20a obtained in the main duct 9 and placed in contact with the outside of the inflation valve 33 of the inner tube 32 ensures tightness towards the outside of the tubular air space 34 that, as can be seen, is defined between the main duct 9 and the inflation valve 33.

The auxiliary duct 10 communicates with the volume defined between the inflatable tyre 31, the inner tube 32 and the rim 2 through the tubular air space 34, so that also the tyre 31 can be inflated.

By blowing air through the inflation valve 33 it is thus possible to adjust the pressure in the inner tube 32 and by blowing air through the auxiliary valve 8 it is possible to adjust the pressure inside the tyre 31 and thus the tyre 31 and the inner tube 32 are inflated in a selective and differentiated manner.

In this way, as shown in FIG. 8, the inner tube 32 forces the shoulders 31a of the tyre 31 against the rim 2 and avoids the danger of the tyre 31 coming off the rim or skidding while the bicycle is running.

The selective adjustment of the pressure values of the air quantities introduced in the tyre 31 and the inner tube 32 makes it possible to regulate the thrusting action of the shoulders 31a of the tyre 31 against the rim 2 in order to obtain the optimal adhesion conditions.

Figure 9:
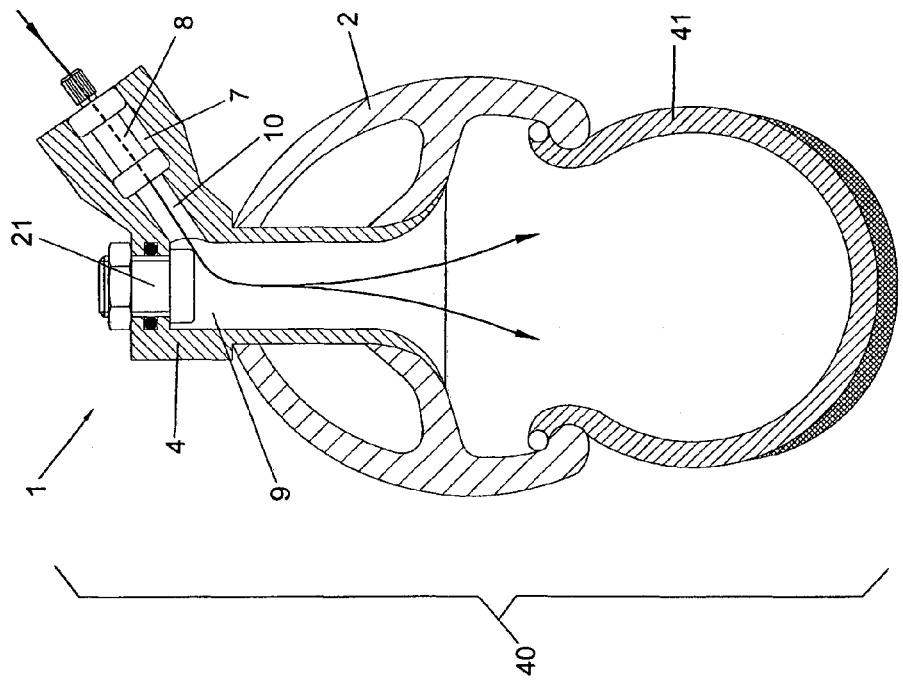

According to another embodiment, the valve unit 1 of the invention is used to obtain a wheel, indicated as a whole by 40 and shown in FIG. 9, which comprises a rim 2 associated with an inflatable tyre of the tubeless type 41.

In this embodiment the valve unit 1 comprises a cap 21 applied to the main duct 9 upstream of the area of intersection with the auxiliary duct 10 and inflation of the tyre 41 in this case is obtained by blowing air through the auxiliary inflation valve 8 present in the valve seat 7 of the valve body 4.

Figure 10:
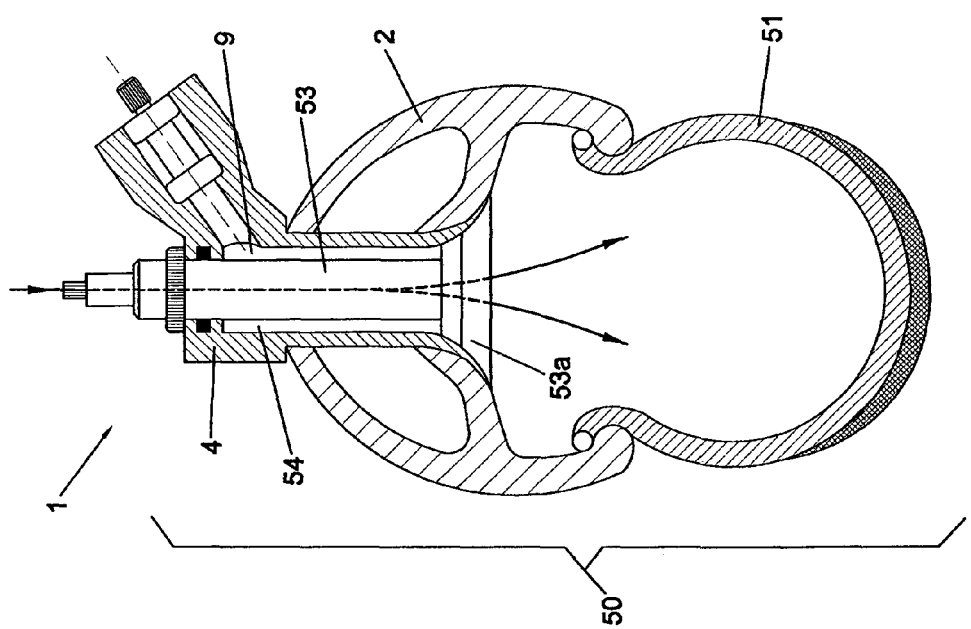

According to a further embodiment, the valve unit 1 of the invention is used to obtain a wheel, indicated as a whole by 50 and shown in FIG. 10, which comprises a rim 2 provided with a tubeless tyre 51, wherein an inflation valve 53 is inserted in and passes through the main duct 9 and has its projecting end in communication with the volume included between the tyre 51 and the rim 2.

The air is blown into the tyre 51 through the valve 53 and tightness towards the outside of the tubular air space 54 defined between the valve 53 and the main duct 9 of the valve body 4 is guaranteed by the adhesion of the shaped end 53a of the valve 53 to the rim 2.

In this embodiment there may also be no sealing ring 20.

Figure 11:
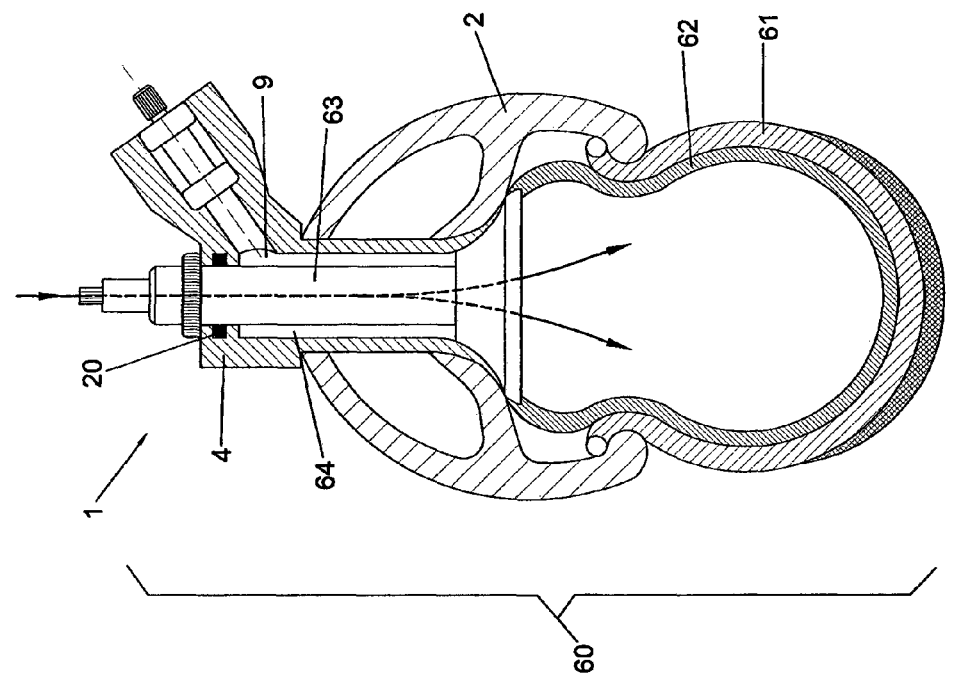

According to another embodiment, the valve unit 1 of the invention is used to obtain a wheel, indicated as a whole by 60 and shown in FIG. 11, which comprises a rim 2 provided with a tyre 61 in which there is an inner tube 62 provided with a valve 63 that is inserted in and passes through the main duct 9 and has its end that projects from the valve body 4.

The air is blown into the tyre 61 through the valve 63 and tightness towards the outside of the tubular air space 64 defined between the valve 63 and the main duct 9 of the valve body 4 is ensured by the presence of the sealing ring 20 provided between the valve 63 and the main duct 9.

According to a further embodiment the valve unit 1 of the invention is used to obtain a wheel, indicated as a whole by 70 and shown in FIG. 12, which comprises a rim 2 provided with a tyre consisting of a tubular tyre 71 of the known type comprising an inflation valve 73 and an inner tube 71a outside which there is the casing of a covering element 71b provided with shoulders 71c and tread 71d.

The air is blown into the tubular tyre 71 through the valve 73 and in this case, as the inside of the tubular tyre 71 is insulated from the external environment, it is not necessary to ensure tightness towards the outside of the tubular air space 74 defined between the valve 73 and the main duct 9 of the valve body 4.

Also in this case, therefore, the presence of the sealing ring 20 between the valve 63 and the main duct 9 is not indispensable any longer.

According to another embodiment that is not illustrated in the figures, in the variants having an inner tube inside the tyre the former is replaced by a tubular tyre of the type already described above.

A wheel constructed using said embodiment can work even in case of puncture.

In fact, in such a case the absence of pressure inside the space defined between the tyre, the tubular tyre and the rim can be remedied by increasing the inflation pressure of the tubular tyre, so that its tread adheres to the inner surface of the tyre.

In this case the wheel will keep running correctly without being damaged.

The above clearly shows that the valve unit of the invention achieves all the set objects.

In particular, the invention achieves the object to provide a valve unit 1 made in a single piece and thus constituted by a single valve body 4.

Advantageously, this makes it possible to reduce production costs and also the costs for assembling the valve unit onto the rim thanks to the reduced number of parts to be assembled together and on the external rim.

Furthermore, the fact that the valve unit of the invention does not include elements that project towards the inside of the rim and are in contact with the inner tube or the tubular tyre, once these have been inflated allows them to expand and adhere completely to the internal profile of the rim 2 that houses them, without coming in contact with parts that may damage them.

The small size of the valve unit of the invention and in particular the fact that it projects from the rim only to a limited extent, as shown in the figures, facilitate assembly.

Furthermore, the valve unit of the invention is suited to be coupled with most of the inflation valves for inner tubes, tubulars and tubeless tyres available on the market.

Finally, the absence of connected portion and fixing nuts for fixing to the rim make the valve unit of the invention lighter than the valve unit provided by the patents mentioned above.

Furthermore, it has been shown that the valve unit of the invention can be applied to any type of wheel, independently of whether it is provided only with an inflatable tyre, therefore of the tubeless type, or only with a tubular tyre or again with a tyre with inner tube or tubular.

In the construction stage the valve unit that is the subject of the invention can be subjected to changes which are neither described herein not illustrated in the figures but which must all be considered protected by the present patent, provided that they fall within the claims that follow.

Where technical features mentioned in any claim are followed by reference signs, those reference signs have been included for the sole purpose of increasing the intelligibility of the claims and accordingly such reference signs do not have any limiting effect on the protection of each element identified by way of example by such reference signs.

The invention claim is:

1. A valve unit for wheels having a rim with at least one tyre, the valve unit comprising a valve body comprising:
   a cylindrical collar suited to be inserted in a hole made in said rim;
   a valve seat accommodating an auxiliary valve for inflating said at least one tyre;
   a main duct passing through the length of said cylindrical collar;
   an auxiliary duct that intersects said main duct in order to place said valve seat in communication with said main duct,
   wherein said valve body is a single-piece body in which said cylindrical collar, said valve seat and said main duct and auxiliary duct are obtained, said cylindrical collar projecting from a reference plane obtained in said valve body, said reference plane being configured to be arranged against said rim when said cylindrical collar is inserted in said hole, an end of said cylindrical collar being configured to be deformed for defining a flared portion of said main duct, said flared portion being configured to interfere with said rim at the level of said hole thus obtaining means for fixing said valve unit to said rim.

2. The valve unit according to claim 1, wherein the inner diameter of said end is larger than the inner diameter of said main duct.

3. The valve unit according to claim 1, wherein said flared portion has a convex surface facing towards the tyre applied to said rim.

4. The valve unit according to claim 1, wherein said valve body further comprises at least one sealing ring housed in a seat obtained in said main duct.

5. A method for assembling a valve unit according to claim 1 on a rim, wherein said method comprises the following operations:
   arranging said valve body coaxial with said hole;
   inserting said cylindrical collar of said valve body in said hole until placing said reference plane in contact with said rim;
   deforming said end of said cylindrical collar so as to obtain said flared portion interfering with said hole in said rim.

6. A wheel comprising a rim to which at least one tyre is connected, wherein said rim is associated with a valve unit according to claim 1 for the inflation of said at least one tyre.

7. The wheel according to claim 6, wherein said at least one tyre comprises an inflatable tyre of the tubeless type, and wherein said valve unit is provided with a cap applied to said main duct at a location upstream of an area of intersection with said auxiliary duct.

8. The wheel according to claim 6, further comprising:
   said at least one tyre comprising an inflatable tyre of the tubeless type, and
   an inflation valve inserted in and passing through said main duct and communicating with a volume defined between said inflatable tyre and said rim.

9. The wheel according to claim 6, wherein said at least one tyre comprises an inflatable tyre containing an inner tube provided with an inflation valve, wherein said inflation valve is coaxially inserted in said main duct and crosses the auxiliary duct of said valve body, said auxiliary duct communicating with a volume defined between said inflatable tyre, said inner tube and said rim, said auxiliary duct communicating with said volume through a tubular air space defined between said main duct and an outside of said inflation valve.

10. The wheel according to claim 6, wherein said at least one tyre comprises an inflatable tyre containing an inner tube provided with an inflation valve, wherein said inflation valve is inserted in and passes through said main duct.

11. The wheel according to claim 6, wherein said at least one tyre comprises a tubular tyre with an inflation valve and an inner tube, a casing of a covering element being sewn on an outside of said inner tube, said covering element being provided with shoulders and tread, wherein said inflation valve is arranged in order to pass through said main duct.

12. A bicycle comprising wheels, wherein at least one of the wheels comprises the wheel as recited in claim 6.

\* \* \* \* \*